United States Patent
Hausman et al.

(10) Patent No.: US 12,320,064 B2
(45) Date of Patent: Jun. 3, 2025

(54) CARPET TILE WITH WET LAID DUAL LAYER NONWOVEN MAT

(71) Applicant: JOHNS MANVILLE, Denver, CO (US)

(72) Inventors: Richard T Hausman, Waterville, OH (US); Souvik Nandi, Highlands Ranch, CO (US); Philip Christopher Sharpe, Weddington, NC (US); Steven Westbrook, Mount Juliet, TN (US)

(73) Assignee: Johns Manville, Denver, CO (US)

( * ) Notice: Subject to any disclaimer, the term of this patent is extended or adjusted under 35 U.S.C. 154(b) by 582 days.

(21) Appl. No.: 16/431,831

(22) Filed: Jun. 5, 2019

(65) Prior Publication Data

US 2020/0385922 A1 Dec. 10, 2020

(51) Int. Cl.
*D06N 7/00* (2006.01)

(52) U.S. Cl.
CPC ......... *D06N 7/0071* (2013.01); *D06N 7/0036* (2013.01); *B32B 2471/02* (2013.01); *D06N 2201/082* (2013.01); *D06N 2209/1628* (2013.01); *Y10T 428/23979* (2015.04)

(58) Field of Classification Search
CPC .............. D06N 7/0084; D06N 7/0071; D06N 2201/082; D06N 2209/1628; D06N 2211/066; Y10T 428/23979; B32B 2471/02
See application file for complete search history.

(56) References Cited

U.S. PATENT DOCUMENTS

| | | | |
|---|---|---|---|
| 2,776,233 A | 1/1957 | Roberts et al. | |
| 3,014,829 A | 12/1961 | Curtin | |
| 3,120,083 A | 2/1964 | Dahlberg et al. | |
| 3,173,823 A | 3/1965 | Guinard | |
| 3,238,595 A | 3/1966 | Schwartz et al. | |
| 3,309,259 A | 3/1967 | Schwartz | |
| 3,320,113 A | 5/1967 | Nicholas et al. | |
| 3,347,735 A | 10/1967 | Dildilian | |
| 3,402,094 A | 9/1968 | Levitch | |
| 3,515,622 A | 6/1970 | Jordan | |
| 3,642,516 A | 2/1972 | Gasaway et al. | |
| 3,764,448 A | 10/1973 | Nisbet et al. | |
| 3,826,067 A * | 7/1974 | Wilder ................. | F01N 3/0217 55/498 |
| 4,010,302 A | 3/1977 | Anderson et al. | |
| 4,629,642 A * | 12/1986 | Kernstock .............. | D03D 27/00 428/95 |
| 4,702,950 A * | 10/1987 | Slosberg ................. | B32B 27/12 428/95 |
| 5,030,497 A * | 7/1991 | Claessen .............. | D06N 7/0081 428/95 |
| 5,204,155 A * | 4/1993 | Bell ........................ | B32B 11/10 428/95 |
| 5,545,276 A * | 8/1996 | Higgins ............... | D06N 7/0081 156/79 |

(Continued)

*Primary Examiner* — Larissa Rowe Emrich
(74) *Attorney, Agent, or Firm* — Robert D. Touslee (57) ABSTRACT

A carpet tile, includes a pile fabric layer, a primary backing coupled with the pile fabric layer, a secondary backing coupled with the primary backing, and a dual-layer wet-laid nonwoven mat. The dual-layer wet-laid nonwoven mat includes a first layer comprising a plurality of glass fibers and a first binder and a second layer comprising a plurality of synthetic fibers and a second binder.

17 Claims, 8 Drawing Sheets

(56) References Cited

U.S. PATENT DOCUMENTS

| | | | | |
|---|---|---|---|---|
| 5,902,663 | A * | 5/1999 | Justesen | B32B 7/12 |
| | | | | 442/403 |
| 6,203,881 | B1 * | 3/2001 | Higgins | D06N 7/0068 |
| | | | | 428/95 |
| 6,432,482 | B1 * | 8/2002 | Jaffee | B32B 5/022 |
| | | | | 427/389.9 |
| 6,767,851 | B1 * | 7/2004 | Rokman | D04H 1/64 |
| | | | | 162/149 |
| 2006/0099870 | A1 * | 5/2006 | Garcia | D04H 1/4218 |
| | | | | 442/374 |
| 2008/0108266 | A1 * | 5/2008 | Kajander | D21F 11/04 |
| | | | | 264/510 |
| 2008/0233336 | A1 * | 9/2008 | Giannopoulos | B29C 48/07 |
| | | | | 428/95 |
| 2017/0166770 | A1 * | 6/2017 | Hall, Jr. | D06N 3/0063 |
| 2017/0166771 | A1 * | 6/2017 | Hall, Jr. | C09D 153/00 |
| 2018/0282942 | A1 * | 10/2018 | Segars | B32B 5/022 |
| 2019/0077114 | A1 * | 3/2019 | Gallman | B32B 37/15 |
| 2019/0275765 | A1 * | 9/2019 | Eckert | B32B 3/266 |
| 2019/0352845 | A1 * | 11/2019 | Coon | D06N 7/0068 |
| 2020/0331246 | A1 * | 10/2020 | Ingram | B32B 5/024 |
| 2021/0032808 | A1 * | 2/2021 | Segars | B32B 27/302 |
| 2022/0205173 | A1 * | 6/2022 | Tyler | D06N 7/0068 |

\* cited by examiner

CARPET TILE WITH WET LAID DUAL LAYER NONWOVEN MAT

BACKGROUND OF THE INVENTION

Carpet tiles offer considerable advantages over rugs or wall to wall carpeting. For example, the use of carpet tiles for floor covering provides a simple installation process and allows removal of individual tiles which have become worn or soiled more than other tiles while those tiles which are not worn or soiled may be left in place. Additionally, tiles may be rearranged or replaced to enhance decorative effects. Conventional carpet tiles include a pile fabric facing set into a layer of resilient thermoplastic (including elastomeric) material which is stiffened with a layer of suitable stiffening fibers, such as fiberglass fibers. The tile is generally backed with another layer of resilient elastomeric or thermoplastic material to which an adhesive may be applied to set the carpet tile onto the floor.

Conventional carpet tiles are manufactured using a two-layer process. In some two-layer processes, the product has to be run though a production line twice. In the first pass, a nonwoven fiberglass mat is adhered to greige goods via an extruded thermoplastic secondary backing to form a greige good/extruded backing/fiberglass composite. The greige good/extruded backing/fiberglass composite is then wound onto an A-frame roller at the end of this process. In the second pass, the composite is again coated with the same or different secondary extruded backing and an optional felt layer (such as a polyester spunbond) may be added as the finished bottom side of the carpet tile. In other two-layer processes, the product is only run through the line once. In the first pass, a plastisol coating/secondary backing is applied to greige goods before a nonwoven fiberglass mat is adhered to form a greige good/extruded backing/fiberglass composite. The greige good/extruded backing/fiberglass composite is then coated again with the plastisol coating/secondary backing (with the coating going on the uncoated top side of the fiberglass) in a downstream step. This second layer of plastisol is designed to result in complete wet out of the fiberglass mat ensuring sufficient lamination strength and to act as the finished bottom side of the carpet tile. These two-part processes are both inefficient and expensive.

BRIEF SUMMARY OF THE INVENTION

Embodiments of the present invention are directed to carpet tiles that can be produced using a single layer production process, while providing enhanced dimensional stability. Such carpet tiles not only reduce production costs and increase production efficiency by eliminating steps from the manufacturing process, but also eliminate the need for multiple secondary backing layers. The carpet tiles of the present invention achieve these results by incorporating a dual-layer wet-laid nonwoven mat in place of one of the secondary backing layers as well as an optional felt layer. The top layer of the nonwoven mat is formed from coarse glass fibers, while the second layer is formed from synthetic fibers and/or a combination of synthetic fibers and coarse glass fibers. The synthetic fiber layer proves a smoother, non-itchy surface that remains exposed and is easy to handle by installation personnel.

In one embodiment, a carpet tile is provided. The carpet tile may include a pile fabric layer, a primary backing coupled with the pile fabric layer, a secondary backing coupled with the primary backing, and a dual-layer wet-laid nonwoven mat. The dual-layer wet-laid nonwoven mat may include a first layer comprising a plurality of glass fibers and a first binder and a second layer comprising a plurality of synthetic fibers and a second binder.

In another embodiment, a method of installing a carpet tile is provided. The method may include providing a carpet tile. The carpet tile may include a pile fabric layer, a primary backing coupled with the pile fabric layer, a secondary backing coupled with the primary backing, and a dual-layer wet-laid nonwoven mat. The dual-layer wet-laid nonwoven mat may include a first layer comprising a plurality of glass fibers and a binder and a second layer comprising a plurality of synthetic fibers and the binder. The method may also include providing an adhesive between an exposed surface of the second layer and a floor substrate and applying force to a top surface of the carpet tile to adhere the carpet tile to the floor substrate using the adhesive.

In another embodiment, a method of manufacturing a carpet tile is provided. The method may include providing a pile fabric layer having a primary backing and coating the primary backing with a secondary backing. The method may also include applying a dual-layer wet-laid nonwoven mat to an exposed surface of the secondary backing to form a carpet sheet. The dual-layer wet-laid nonwoven mat may include a first layer comprising a plurality of glass fibers and a binder and a second layer comprising a plurality of synthetic fibers and the binder. The first layer may be positioned toward the secondary backing. The method may further include cutting the carpet sheet into a plurality of carpet tiles.

BRIEF DESCRIPTION OF THE DRAWINGS

Various features, aspects, and advantages of the present invention will be better understood when the following detailed description is read with reference to the accompanying figures in which like characters represent like parts throughout the figures, wherein.

DETAILED DESCRIPTION OF THE INVENTION

The ensuing description provides exemplary embodiments only, and is not intended to limit the scope, applicability, or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Embodiments of the present invention provide carpet tiles that, instead of having two separate layers of thermoplastic backing as in conventional tiles, use a single application of thermoplastic backing between the primary backing and a reinforcing mat/scrim. In such conventional applications, the mat/scrim must impart the required dimensional stability and create a suitable finished floor facing surface. Embodiments of the invention achieve the desired dimensional stability by providing a dual layer wet laid nonwoven mat in which one layer consists of a polymeric/synthetic fiber with binder and the other layer is glass fiber with a binder. The mat not only provides dimensional stability, but the polymeric/synthetic layer also acts as a finished surface for facing the floor, as the polymeric/synthetic layer is not itchy or otherwise uncomfortable to handle and therefore provides a surface that is suitable for handling during installation.

Dimensional stability is important in a carpet tile. Dimensional stability, as understood in the art, is the ability of a carpet tile to lie flat and remain flat and square on a floor surface under conditions of normal use as described in U.S. Pat. No. 4,010,302, the entire contents of which are hereby incorporated by reference. The industry standard Aachen DIN STD 54318 test is used to determine the dimensional stability. Fiberglass mats or scrims may be placed between resilient thermoplastic backing layers to impart dimensional stability in carpet tiles.

Figure 1A:
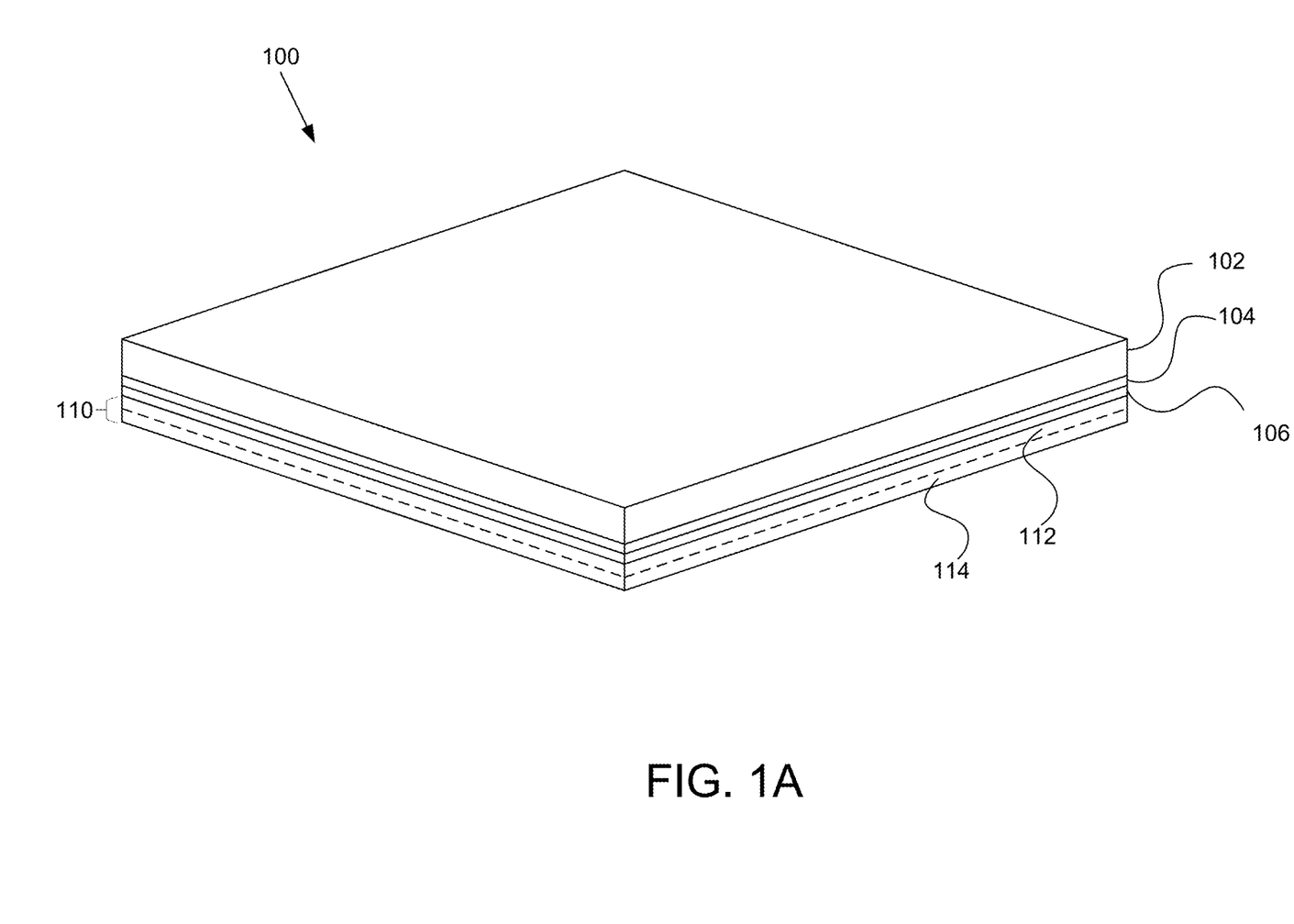
FIG. 1A is an isometric view of a carpet tile according to embodiments.
Figure 1B:
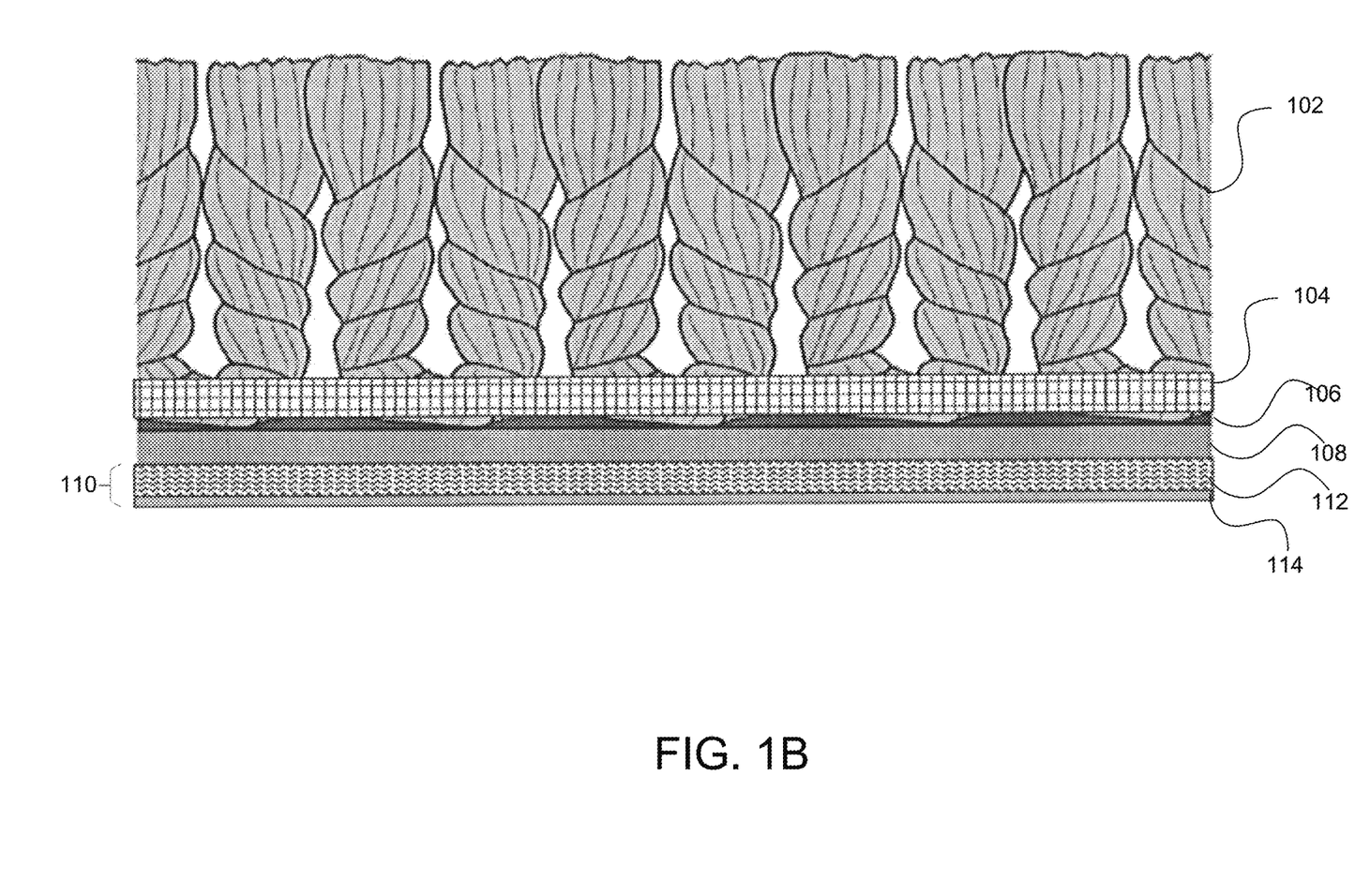
FIG. 1B is a side view of the carpet tile of FIG. 1A.

Turning now to the figures, a carpet tile 100 according to the present invention is shown in FIG. 1A. While shown here as being square-shaped, it will be appreciated that carpet tile 100 may be cut or otherwise formed in any desired shape and can be sized to match any desired application. Additionally, the textile top layer may be formed from any fabric or other textile material to fit the needs or aesthetics of a particular application. Carpet tile 100 may include a textile top layer positioned atop one or more backing layers and a dual-layer wet-laid nonwoven mat having a top glass fiber layer and a bottom synthetic fiber layer. For example, as shown in FIG. 1B, carpet tile 100 may include a fabric layer 102, such as a pile fabric layer or other fabric layer serving as an exposed top surface of the carpet tile 100. The fabric layer 102 may be secured to a primary backing layer 104. Primary backing layer may be made of polyester and/or polypropylene. The primary backing 104 may be secured to a secondary backing 108, with a latex pre-coat 106 being positioned between the primary backing 104 and the secondary backing 108 in some embodiments. The secondary backing 108 may be formed from a thermoplastic elastomer and/or a plastisol material, such as polyolefins, polyvinyl chloride (PVC), and/or polyurethane.

Figure 2:
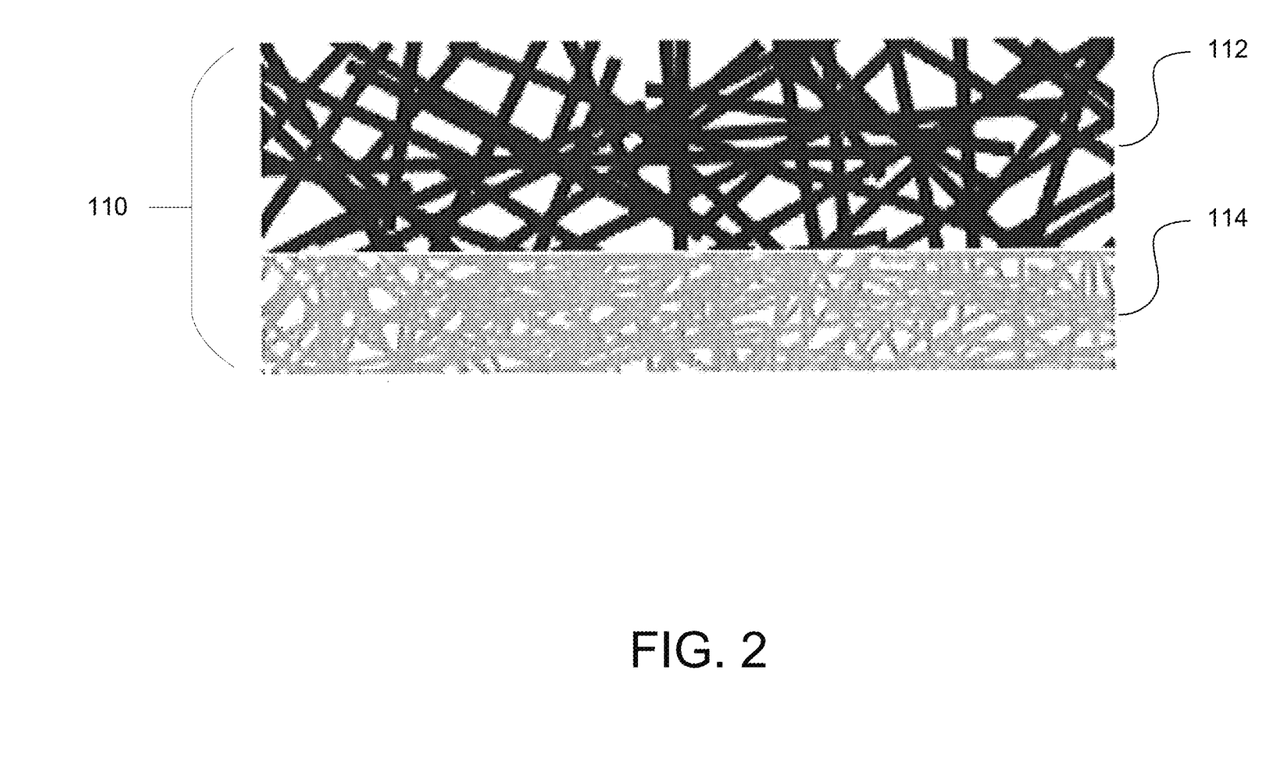
FIG. 2 is a schematic view of a dual layer wet-laid mat according to embodiments.

A dual layer fiberglass mat 110 may be coupled to the secondary backing 108. As best seen in FIG. 2, the dual layer fiberglass mat 110 may include a first layer 112 that is formed from a plurality of glass fibers that are held together using a binder and a second layer 114 that is formed from a plurality of synthetic fibers and a binder. The second layer 114 formed of synthetic fibers provides a soft, non-itchy exposed bottom surface that may be grasped by the installers. This layer helps prevent the installers from needing to directly touch an itchy glass layer. The glass fibers of the first layer 112 may have diameters of between 8 and 25 µm, between 8 and 16 µm, and more commonly between 11 and 16 µm, and in some embodiments may include a mixture of coarse fibers having an average diameter between 8 and 11 µm mixed with a second type of coarse fibers having a diameter between 12 and 25 µm. The coarse fibers may have lengths of between about ¼ inch and 2 inches. The first layer 112 may include 60-95% of glass fibers and 5-40% of binder. The second layer 114 may include 60-95% of synthetic fibers and 5-40% of binder. The synthetic fibers of the second layer 114 may be meltable or laminatable fibers such as polyester, polypropylene, nylon, polyethylene, and the like. The binder may be an acrylic type binder, such as Dow QRXP-1692 or BASF Acrodur 950L. In some embodiments, the second layer 114 may also include some percentage of glass fibers mixed in with the synthetic fibers to further increase the dimensional stability of the carpet tile 100. In some embodiments, the first layer 112 may have a thickness of between about 0.1 mm and 1.5 mm, while the second layer 114 may have a thickness of between about 0.1 mm and 4 mm such that the mat 110 has a total thickness of between about 0.2 mm and 5.5 mm.

The dual layered fiberglass mat 110 may be formed from a wet laid process such that there is not a separate binder or adhesive used to adhere the layers to one another. For example, the nonwoven mats discussed below include multiple layers of fibers made in a single step or process. In other words, the layers of the mats discussed below are not separately formed and then combined in a later stage or process (i.e., separately made and then bonded together). Rather, the layers are formed simultaneously, which results in a mat that functions as a single layer in terms of structure and integrity despite having different fiber compositions and layer densities. Accordingly, the mats discussed may be produced at lower cost and in less time.

The first layer 112 may include a blend of differently sized glass fibers. The differently sized glass fibers form layers of different densities within the mat. For example, the top layer may include both coarse and microfibers. The coarse or larger diameter fibers may range in size between about 8 and about 25 µm, and small diameter fibers or microfibers may range in size between about 0.5 and 6 µm. In a more specific embodiment, the coarse or larger diameter fibers may range in size between about 8 and about 16 µm, and more commonly between about 11 and 16 µm.

In a specific embodiment, the larger diameter fibers may be about 13 µm diameter fibers and the microfibers may be about 3 µm in diameter. The mat includes at least one binder that bonds the large diameter fibers and microfibers together to form the fiber mat. The binder may be water repellant and/or include a water repellant additive such as a stearylated melamine water repellant.

Typically, the first layer 112 is a non-woven fiber mat 110 formed using coarse fibers. The course fiber layer 112 provides dimensional stability to the finished carpet tile 100. The term "coarse fibers" in this application is understood to mean glass fibers having an average diameter between about 8 and 25 µm and an average length between about ¼ inch and 2 inches. The coarse fibers may be made from E glass, C glass, T glass, sodium borosilicate glass, A & S glasses, Basalt, mineral wool, slag fiber, and mixtures thereof. In one particular embodiment, the first layer 112 may be formed entirely of coarse fibers having an average fiber diameter of between 8 and 25 µm, between 8 and 16 µm, and more commonly between 11 and 16 µm. In another embodiment, the first layer 112 may be formed from a combination of differently sized coarse fibers, which are typically homogenously dispersed or distributed throughout the first layer 112. For example, the first layer 112 may be formed from a first type of coarse fibers having an average diameter between 8 and 11 µm, which is then mixed with a second type of coarse fibers having a diameter between 12 and 25 µm. In another embodiment, the first layer 112 may be formed from a combination of coarse glass fibers having fiber diameter between 8 and 25 µm and synthetic fiber having fiber diameter between 0.3 and 8 denier. For example, the percentage by weight of the coarse fibers in the second layer 112 may vary between 70 and 99 percent, while the percentage by weight of the synthetic fibers may vary between 1 and 30 percent. The inclusion of synthetic fiber may be necessary to combat the differential shrinkage characteristics between glass fiber and synthetic fiber.

In some embodiments, the second layer 114 may be formed solely out of synthetic fibers, such as polyester, polypropylene, polyethylene terephthalate (PET), and/or other synthetic materials. In another embodiment, the second layer 114 may be formed out of a combination of coarse glass fibers and synthetic fibers. When a combination of coarse fibers and synthetic fibers are employed, the coarse fibers and synthetic fibers are typically homogenously dispersed or distributed throughout the second layer 114. In an embodiment that includes both coarse fibers and synthetic fibers, the percentage of weight of the coarse fibers and the synthetic fibers may vary. For example, the percentage by weight of the coarse fibers in the second layer 114 may vary between 1 and 80 percent, while the percentage by weight of the synthetic fibers may vary between 20 and 99 percent. In another embodiment, the percentage by weight of the coarse fibers in the second layer 114 may vary between 1 and 20 percent, while the percentage by weight of the synthetic fibers may vary between 80 and 99 percent, which would result in a mat 110 that is substantially smoother and less itchy. The inclusion of coarse fibers in the second layer 114 provides additional strength and integrity to the layer and helps increase the dimensional stability of the finished carpet tile 100.

In embodiments where both first layer 112 and second layer 114 are produced with a combination of coarse glass fibers and synthetic fibers, the ratio of glass to synthetic fiber is distinctly different in each of the two layers.

As noted above, in some embodiments the second layer 114 may be formed entirely of synthetic fibers having an average fiber diameter of between 0.3 and 8 denier. The second layer 114 may be formed from a single, relatively uniform, synthetic fiber size or the second layer 114 may be formed from a combination of differently sized synthetic fibers, which are typically homogenously dispersed or distributed throughout the second layer 114. For example, the second layer 114 may be formed from a first type of synthetic fibers having an average diameter between 0.3 and 1 denier, which is then mixed with a second type of synthetic fibers having an average diameter between 1.5 and 8 denier. The weight percentages of the first and second types of synthetic fibers may vary in the second layer 114. For example, the percentage by weight of the first type of synthetic fibers may vary between 5 and 50 percent while the second type of synthetic fibers may vary between 50 and 95 percent. The percentages of the first and second types of synthetic fibers may be varied depending on a desired texture or attribute affecting the tactile feel of the resulting layer 114. For example, if the layer 114 needs to be smooth, the layer 114 will contain a higher percentage of the smaller synthetic fibers.

The mat 110 includes a binder that binds the respective fibers together in the first layer 112 and in the second layer 114 and that also bonds the first layer 112 and the second layer 114 together. In one embodiment, the mat 110 includes a single binder that functions to both bind the fibers together in the respective layers and bond the respective layers together. The binder is typically homogenously or relatively evenly dispersed or distributed throughout the mat 110. Stated differently, the binder may be distributed homogenously within the first layer 112 and the second layer 114 and may also be homogenously distributed through the first and second layers 112, 114. Since the binder is relatively evenly distributed through the mat 110 in this manner, the mat 110 does not include a separate binder, or a layer of binder (or other adhesive), at an interface between the first layer 112 and the second layer 114. Stated differently, there is not a concentration of a binder at an interface or boundary between the first and second layers 112, 114 since the binder is evenly distributed through the mat 110. This even distribution of the binder results from the formation of the first and second layers 112, 114 in a single step. In addition, the fibers of the first and second layers 112, 114 are more integrated, intertwined, and intermeshed with one another at the interface or boundary of the layers due to the formation of the layers in a single step. This results in more gradual transition between the first and second layers 112, 114.

The binder is uniformly or homogenously distributed throughout the top and bottom layers and there is no binder concentration at the interface. In addition, because the two layers were formed simultaneously, a small gradient of glass and synthetic fibers exists at the interface, which enhances the physical bond or entanglement of the fibers of the top and bottom layers. Specifically, a portion of the synthetic fibers of the second layer 114 at or near the interface migrate into the first layer 112 and vice versa. The degree of migration of the fibers and the resulting physical bond or entanglement is unique to the mats formed in accordance with the disclosure herein since such entanglement and migration is not achievable without simultaneously forming the layers. The migration of the fibers is a desirable feature since it makes the interface between the layers gradual, which may allow the secondary backing 108 to partially penetrate into the second layer 114. The migration of the fibers also forms a strong bond between the layers.

In some embodiments, the mat 110 may have a combined thickness between about 0.1 and 1.5 mm. In some embodiments, the thickness of the mat 110 may be less than 20 percent of an overall thickness of the carpet tile 100. The first and second layers have respective thicknesses. For example, the thickness of the first layer 112 may be between 0.05 mm and 0.5 mm, and the thickness of the second layer 114 may be between 0.05 mm and 1 mm. Each of these layers 112, 114 may also be defined as a percentage of the overall mat thickness. For example, the first layer 112 may be between 10% and 70% of the overall mat thickness, and the second layer 114 may be between 30% and 90% percent of the overall mat thickness.

In some embodiments, the thickness of the first layer 112 may be greater than the thickness of the second layer 114 because the first layer 112 may include more coarse fibers. Furthermore, because the first layer 112 includes coarse fibers the porosity of the first layer 112 may be greater than the second layer 114. The more porous first layer 112 enables the first layer 112 to absorb a portion of the secondary backing 108 when the mat 110 is applied as a mat to the secondary backing 108, such as by lamination, during manufacturing of the carpet tile 100. Specifically, the secondary backing 108 may be relatively wet or unhardened and may absorb or penetrate into the first layer 112 due to the porosity of the first layer 112. The penetration or absorption of the secondary backing 108 into the first layer 112 may bind the secondary backing 108 to the mat 110 during manufacturing. The second layer 114 may be less porous than the first layer and may prevent the coarse fibers of the first layer 112 from being exposed in order to provide a smoother, non-scratchy exposed bottom surface for the carpet tile 100.

Figure 3:
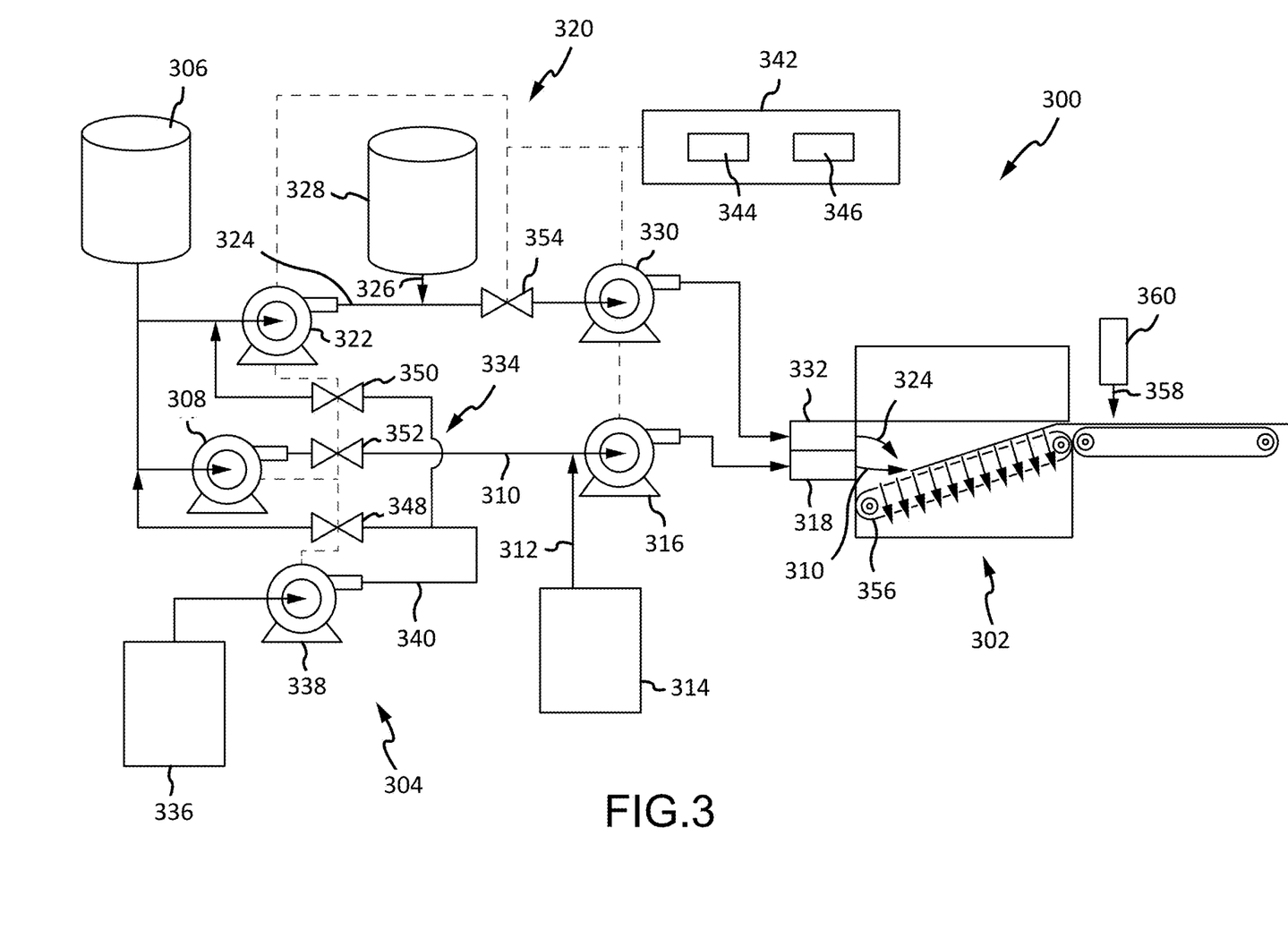
FIG. 3 is a schematic view of a manufacturing system that produces a dual layer wet-laid mat according to embodiments.

FIG. 3 is a schematic view of a manufacturing system 300 that produces a mat 110. In operation, the manufacturing system 300 is able to produce a multilayered mat in a single step/process. That is the layers of the mat are not separately formed and then combined at a later stage or process (i.e., separately made and then bonded together). The mats 110 produced by the manufacturing system 300 may therefore be produced at lower cost and in less time.

The manufacturing system 300 includes multiple fluid lines that deliver coarse fibers and synthetic fibers to a hydroformer 302 that simultaneously forms the first and second layers 112, 114 of the mat 110. While a hydroformer 302 is illustrated, a fourdrinier wire or a delta former may also be used to produce first and second layers 112, 114 of the mat 110 in a single step/process.

The manufacturing system 300 produces the first layer 112 using a first fluid line 304 that delivers coarse fiber to the hydroformer. The first fluid line 304 includes at least one coarse fiber source 306 containing one or more types of coarse fibers (e.g., differently sized coarse fibers, coarse fibers made from different materials, or a combination thereof). Fluidly coupled to the coarse fiber source 306 is a pump 308 (e.g., a thick stock pump) that pumps a first fluid 310 containing the coarse fibers. For example, the first fluid 310 may include water, viscosity modifiers, dispersants, defoamers, etc. mixed with the coarse fibers. After passing through the pump 308, the first fluid 310 is diluted with a dilution fluid 312 (e.g., water, viscosity modifiers, dispersants, defoamers, or a combination thereof) stored in a dilution tank 314. By diluting the coarse fibers, the manufacturing system 300 may enable a more even distribution of the coarse fibers in the first layer 112 by the hydroformer. The dilution fluid 312 combines with the first fluid 310 before the first fluid 310 enters a second pump 316. The pump 316 (e.g., thin stock pump) may facilitate mixing of the first fluid 310 and the dilution fluid 312 before delivery to the hydroformer 302. After exiting the pump 316, the first fluid 310 enters a first inlet pipe 318 of the hydroformer 302. The first inlet pipe 318 directs the first fluid 310 into the hydroformer 302, which forms the first layer 112 of the mat 110 by removing the first fluid 310 and dilution fluid 312 from the fluid/coarse fiber mixture as the mixture is poured onto the hydroformer 302.

In order to form the second layer 114 of the mat 110, the manufacturing system 300 includes a second fluid line 320. The second fluid line 320 includes at least one synthetic fiber source 306 containing one or more types of synthetic fibers (e.g., differently sized synthetic fibers, synthetic fibers made from different materials, or a combination thereof). Fluidly coupled to the synthetic fibers source 306 is a pump 322 (e.g., a thick stock pump) that pumps a second fluid 324 containing the synthetic fibers. For example, the second fluid 324 may include water, viscosity modifiers, dispersants, defoamers, etc. mixed with the synthetic fibers. After passing through the pump 322, the second fluid 324 is diluted with a dilution fluid 326 (e.g., water, viscosity modifiers, dispersants, defoamers, or a combination thereof) stored in a dilution tank 328. By diluting the second fluid 324, the manufacturing system 300 may enable even distribution of the fibers in the second layer 114. The dilution fluid 326 combines with the second fluid 324 before the second fluid 324 enters a second pump 330. The pump 330 (e.g., thin stock pump) enables mixing of the second fluid 324 and the dilution fluid 326 before delivery to the hydroformer 302. After exiting the pump 330, the second fluid 324 enters a second inlet pipe 332 of the hydroformer 302. The second inlet pipe 332 directs the second fluid 324 into the hydroformer 302, which forms the second layer 114 of the mat 110 by removing the second fluid 324 and dilution fluid 326 from the fluid/fiber mixture as the mixture is poured onto the hydroformer 302 atop the first layer of the mat 110 that was immediately formed by the hydroformer 302. The second fluid 324 is directed or poured atop the first layer of the mat 110 as the fluid is being drained from the first fluid 310 such that the second layer 114 and the first layer 112 are formed simultaneously by the hydroformer 302.

In some embodiments, fluidly coupled to the second fluid line 320 is a third fluid line 334. The third fluid line 334 includes at least one coarse fiber source 336 containing one or more types of coarse fibers (e.g., differently sized coarse fibers, coarse fibers made from different materials, or a combination thereof). Fluidly coupled to the coarse fiber source 336 is a pump 338 (e.g., a stock pump) that pumps a third fluid 340 containing the coarse fibers. The third fluid 340 may include water, viscosity modifiers, dispersants, defoamers, etc. mixed with the coarse fibers. After passing through the pump 338, the third fluid 340 may be pumped into the second fluid line 320. In this way, coarse fibers may be mixed with synthetic fibers of the second layer 114. As illustrated, the third fluid line 334 couples upstream from the pump 330. By coupling upstream from the pump 330, the manufacturing system 300 uses the turbulent flow through the pump 330 to facilitate mixing of the third fluid 340 with the second fluid 324. However, in some embodiments, the third fluid line 334 may couple to the second fluid line 320 downstream from the pump 330. For example, the manufacturing system 300 may rely on the pump 330 to mix the third fluid 340 with the second fluid 324. In still other embodiments, the third fluid line 340 may couple upstream as well as downstream of the pump 330. This layout may enable the gradual introduction of the third fluid into the first and/or second fluid lines at different locations.

The flow of the first, second, and third fluids 310, 324, 340 through the manufacturing system 300 may be controlled with a controller 342. The controller 342 may include one or more processors 344 that execute instructions stored on one or more memories 346 to control the operation of various valves as well as the pumps. For example, the third fluid line 334 may include first and second valves 348, 350. As illustrated, the first valve 348 controls the flow of the third fluid 340 into the first fluid line 304, while the second valve 350 controls the flow of the third fluid 340 into the second fluid line 320. By controlling the first and second valves 348, 350 the controller 342 is able to control the amount of the third fluid 340 combining with the second fluid 324. This in turn controls the amount of coarse fibers in the second layer 114 produced in the hydroformer 302. In this way, the manufacturing system 300 may vary the coarse fiber content in the second layer 114 to between 0 and 100 percent, and more commonly to the percentages described in the mat embodiments herein.

The manufacturing system 300 may also control the fluid flow through the first and second fluid lines 304, 320 using additional valves 352 and 354 as well as controlling the pumps 308, 318, 322, 330, and 338. By controlling the flow of the first and second fluids 310, 324 the controller 342 may increase or decrease thickness of the respective first and second layers 112, 114. Stated differently, the manufacturing system 300 may increase or decrease the thickness of the first and/or second layers 112, 114 of the mat 110 depending on the particular needs of the carpet tile 100. For example, the manufacturing system 300 may increase the flow of the first fluid 310 through the fluid line 304 to increase the thickness of the first layer 112 and decrease the flow of the second fluid 324 to decrease the thickness of the second layer 114. Similarly, the manufacturing system 300 may decrease the flow of the first fluid 310 through the fluid line 304 to decrease the thickness of the first layer 112 and increase the flow of the second fluid 324 to increase the thickness of the second layer 114.

As the first and second fluids 310, 324 enter the hydroformer 302 they contact a conveyer belt 356 that drains a substantially majority of the fluid in the first and second fluids 310, 324 leaving behind the combined first and second layers 112, 114. The manufacturing system 300 may then apply one or more binders 358. In some embodiments, the binder 358 may include resinous binders such as urea formaldehyde, modified urea formaldehyde, acrylic resins, modified acrylic resins, polyurethanes, polyvinyl chlorides, melamine resins, homopolymers or copolymers of polyacrylic acid; crosslinking acrylic copolymers; cross-linked vinyl chloride acrylate copolymer, among other types of binders. Flame retardants may also be included in the binder, such as Alumina trihydrate, organic phosphonates, Antimony oxide, and the like.

These binders 358 may be stored in one or more binder sources 360. The binder(s) 358 may be applied to the first and second layers 112, 114 by moving the first and second layers 112, 114 under a spray or waterfall of binder. Any excess binder may then flow through the first and second layers. In this way, the manufacturing system 300 may bind the fibers in their respective layers as well as bind the layers 112, 114 together without performing multiple binding steps/processes. Stated differently, the manufacturing system 300 may simultaneously bind the fibers in the respective layers and bond the fibers layers together in a single step. The application of the binder(s) 358 to the first and second layers 112, 114 simultaneously results in the binder being relatively evenly distributed through and between the first and second layers 112, 114 without forming or defining a binder layer between the first and second layers 112, 114. Stated differently, a separate or individual layer of binder is not formed or defined at an interface or boundary between the first and second layers 112, 114 as occurs in conventional systems where the layers are formed individually and combined in a subsequent process. The relatively even distribution of the binder(s) 358 may increase the strength of the mat and/or reduce issues such as delamination of the layers. In addition, the mat described herein has a less defined boundary between the first and second layers 112, 114 since these layers are simultaneously formed. Rather, the mat has a relatively gradual transition from the first layer 112 to the second layer 114 due to the simultaneous formation of the layers, which may increase the strength and/or reduce issues such as delamination of the layers.

For convenience in describing the various embodiments herein, the coarse fibers were referred to a glass fibers. It should be realized that various other fiber types may be used in any of the embodiments described herein and that the embodiments are not limited solely to glass fibers unless otherwise specified in the claims. It should also be realized that the use of non-glass fibers are contemplated as being used in any of the embodiments. The non-glass fibers may be used in combination with glass fibers or instead of glass fibers. Accordingly, unless otherwise explicitly specified in the claims, the concepts and embodiments described herein may include only glass fibers, only non-glass fibers, or any combination of glass and non-glass fibers. Exemplary non-glass fibers include inorganic fibers, mineral fibers, basalt fibers, polymer fibers, synthetic fibers, organic fibers, natural fibers, and the like. Similarly, it should be understood that the glass microfibers and/or glass coarse fibers described herein can be partially or completely replaced with polymeric, synthetic, or natural microfibers. Thus, the general term "fibers" and/or "coarse fibers" may be used in the claims with such usage being understood to cover a variety of fibers including glass fibers and non-glass fibers. The term "coarse fibers" will be understood in relation to size to have the definitions provided herein.

Figure 4:
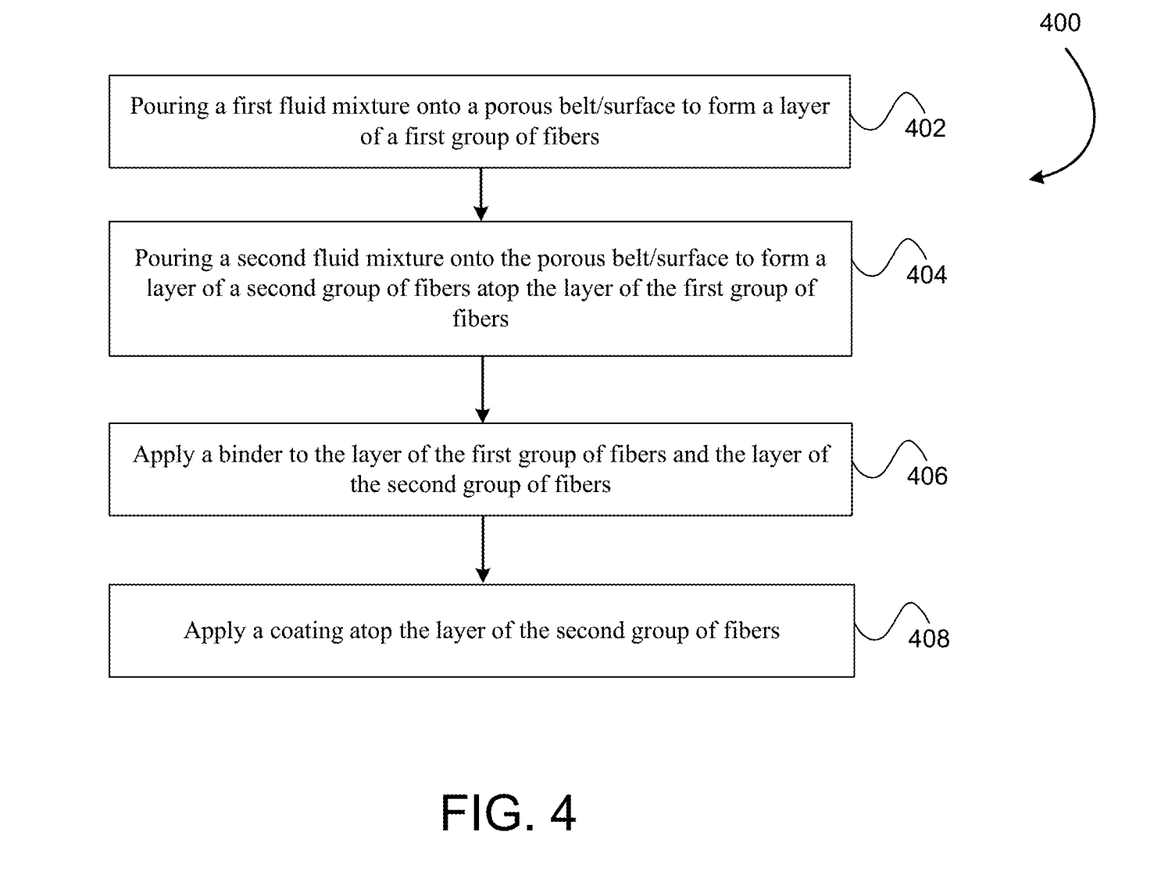
FIG. 4 is a schematic view of a manufacturing system that produces a dual layer wet-laid mat according to embodiments.

Referring now to FIG. 4, illustrated is a method 400 of forming a fiber mat. In a specific embodiment, the fiber mat may be a glass mat 110 for a carpet tile, such as carpet tile 100 described herein. At block 402, a first fluid mixture is poured or applied onto a porous belt or surface. The first fluid mixture includes a first group of fibers that are homogenously mixed or dispersed within a first fluid. In a specific embodiment, the first group of fibers comprise or consist of coarse glass fibers having an average fiber diameter of between 8 μm and 25 μm. When the first fluid mixture is applied or poured atop the porous belt or surface, the first fluid is drained or removed from the first fluid mixture so that a layer of the first group of fibers is formed atop the porous belt or surface. In some embodiments a vacuum may be applied to the porous belt or surface to facilitate in removal of the first fluid from the first fluid mixture.

At block 404, a second fluid mixture is poured or applied onto the porous belt or surface atop the layer of the first group of fibers. The second fluid mixture includes a second group of fibers that are homogenously mixed or dispersed within a second fluid. In one specific embodiment, the second group of fibers comprise or consist of synthetic fibers having an average fiber diameter of between about 0.3 and 8 denier. In another specific embodiment, the second group of fibers comprise or consist of a combination of coarse glass fibers having an average fiber diameter of between 8 μm and 25 μm and synthetic fibers having an average fiber diameter of between 0.3 and 8 denier. The amount of each fiber type may be similar to the embodiments described herein.

When the second fluid mixture is applied or poured atop the porous belt or surface, the second fluid is drained or removed from the second fluid mixture so that a layer of the second group of fibers is formed atop the porous belt or surface and atop the layer of the first group of fibers. The second fluid mixture is poured or applied onto the porous belt or surface as the first fluid is being removed from the first fluid mixture. As such, the layer of the first group of fibers is typically not fully formed or defined until after the second fluid mixture is poured or applied onto the porous belt or surface. In this manner, the layer of the first group of fibers and the layer of the second group of fibers are formed simultaneously atop the porous belt or surface. The second fluid mixture may be poured directly vertically above the first fluid layer and thus, both layers may be poured simultaneously atop each other. Stated differently, since the layer of the first group of fibers is not fully formed or defined until after the second fluid mixture is poured or applied onto the porous belt or surface, the layer of the first group of fibers is formed or defined at essentially the same time as the layer of the second group of fibers is formed or defined atop of the porous belt or surface. Since the layer of the first group of fibers and the layer of the second group of fibers are formed simultaneously, the degree of intermeshing or entangling of the fibers at the interface of the two layers is significantly greater than in conventional fiber mats where one or both of the layers are fully formed or defined prior to application of the other layer. In some embodiments, the second fluid mixture may be poured or applied onto the porous belt or surface within 30 inches of where the first fluid mixture is poured or applied onto the porous belt or surface. In such instances, the fiber mat forming section (i.e., porous belt) may be extremely long such that the first layer is still dewatering when the second fluid mixture is applied to the belt. In other instances, the second layer may be poured within 12 inches or within 6 inches after the first layer is poured or applied to the porous belt. In such instances, the first layer may be partially dewatered, but still in the process of forming on the porous belt. In some embodiments, the second layer 114 (e.g., a more dense layer) may be poured atop the porous belt first and then the first layer 112 (e.g., a less dense layer) may be poured atop the second layer 114. In such instances, a more dense layer may be formed on the bottom while a less dense layer is simultaneously formed on the top.

At block 406, a binder is simultaneously applied to the layer of the first group of fibers and the layer of the second group of fibers in order to bind the two layers together and to bind the various fibers within each layer together. In most embodiments, a binder is not applied to either layer prior to block 406, or stated differently, the layers are typically free of a binder prior to block 406. The simultaneous application of the binder to the two layers, which are typically free of a binder prior to block 406, results in a more homogeneous or uniform distribution of the binder throughout the fiber mat. In addition, the simultaneous application of the binder to the two layer results in the fiber mat being free of a concentrated binder layer at the interface of the two layers. Conventional fiber mats typically include a binder concentration at the interface between layers because the fiber layers are formed separately and then adhered or bonded together via an additional binder or other adhesive. The additional binder bonds the two layers together and is typically concentrated at the interface between the two layers. In contrast, the process described herein is able to form a multiple layer fiber mat construction in which the binder is relatively homogenously or uniformly dispersed throughout the mat rather than being concentrated in one or more areas. In addition, a single binder may be employed to both bond or adhere the layers together and bond or adhere the fibers of the various layers together. Conventional mats commonly require the use of multiple binders in order to bond the fibers of the separate layers together and to subsequently bond the layers together.

In a specific embodiment, the fiber mat that is formed according to the method 400 of FIG. 4 may be a mat for a carpet tile, such as carpet tile 100. In such embodiments, the mat may be applied to the secondary backing during formation of the carpet tile. The layer of the first group of fibers may be capable of absorbing a material of the carpet tile, such as the secondary backing, when the mat is positioned against the secondary backing during formation of the carpet tile. In some embodiments, the layer of the second group of fibers may partially absorb the material of the secondary backing, but may block the material from passing or absorbing through the mat to an exterior surface of the second layer. In this manner, the mat may be adhered or bonded with the secondary backing due to the absorption of the secondary backing material within the mat, but the material may not be visible on the exterior surface.

It should be noted that while the method 400 of FIG. 4 is described as simultaneously forming two layers, the method 400 could be employed to simultaneously form three or more layers as described. For example, block 404 could be repeated with a third fluid mixture, a fourth fluid mixture, and the like to form additional layers atop the layer of the second group of fibers. The binder could then be simultaneously applied to each of the layers at block 406 as desired. Thus, the method 400 of FIG. 4 is not limited to two layer constructions.

Figure 5:
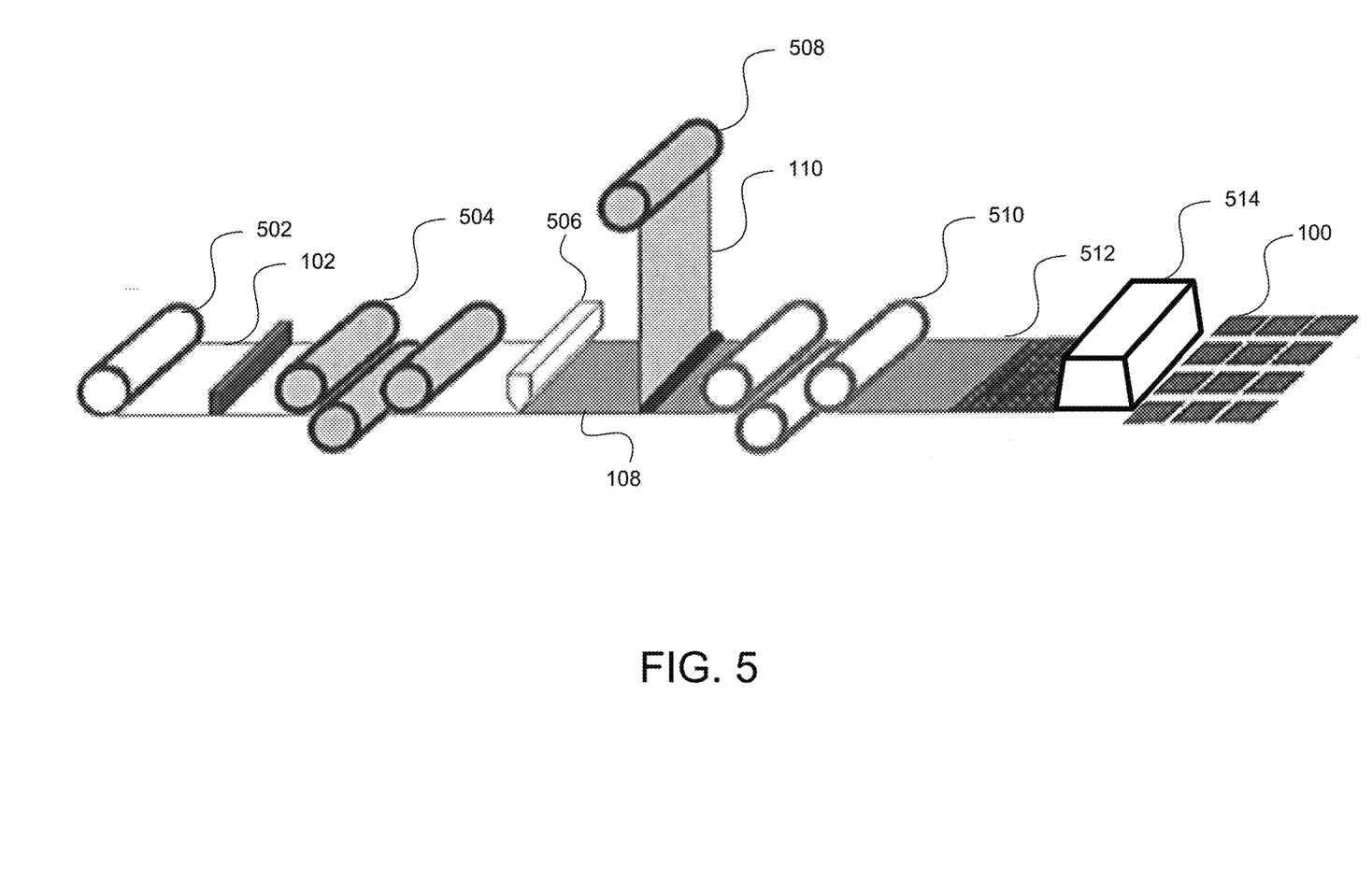
FIG. 5 is a method of forming carpet tiles using a dual layer wet-laid fiber mat according to embodiments.

FIG. 5 depicts a single-pass manufacturing system 500 for manufacturing a carpet tile, such as carpet tile 100, in accordance with the present invention. System 200 includes a greige goods source 502 that supplies a fabric layer 102, such as a pile fabric (or other suitable fabric for carpet applications) having a primary backing 104. This fabric layer 102 may be passed through a roller assembly 504 being passed through an extruder 506. The extruder 506 may extrude or otherwise supply a thermoplastic or plastisol material that serves as a secondary backing 108 to the fabric layer 102. In some embodiments, prior to passing through the extruder 506, the fabric layer 102 is coated with a latex pre-coat 106, which may help strengthen the bond between the carpet yarns with the primary backing 104. A nonwoven mat source 508 is provided downstream of the extruder 506 and supplies a dual-layer wet-laid nonwoven mat 110 against the extruded secondary backing 108.

The mat 110 may be produced separately using manufacturing system 300 and/or process 400 as described above and may include a top layer 112 of coarse glass fibers and a bottom layer 114 of synthetic fibers, and in some embodiments a combination of synthetic fibers and coarse glass fibers. The top layer 112 may be positioned against the secondary backing 108. In some embodiments, the secondary backing 108 is thermoplastic in nature. The fabric layer 102, primary backing 104, secondary backing 108, and nonwoven mat 110 (and latex pre-coat 106 when included) may then pass through a second roller assembly, such as a nip chill roller assembly 510, which may press the respective layers together and cause the layers to bond and set with one another due to the lower temperature of the chill rollers of the nip chill roller assembly 510. In some embodiments, the secondary backing layer 108 is plastisol in nature. The fabric layer 102, primary backing 104, plastisol secondary backing 108, and nonwoven mat 110 (and latex pre-coat 106 when included) may then pass through a set of heated ovens to cure the plastisol and bond the different layers to one another. Once cooled/cured, the various layers form a roll and/or sheet of carpet 512, which may be provided to a cutting apparatus 514, which cuts the carpet 512 into individual carpet tiles 100. In some embodiments, prior to or after cutting the tiles an adhesive layer, such as a pressure sensitive adhesive layer, may be applied to the exposed bottom surface of the carpet tile 100, oftentimes along with a non-stick release liner.

Figure 6:
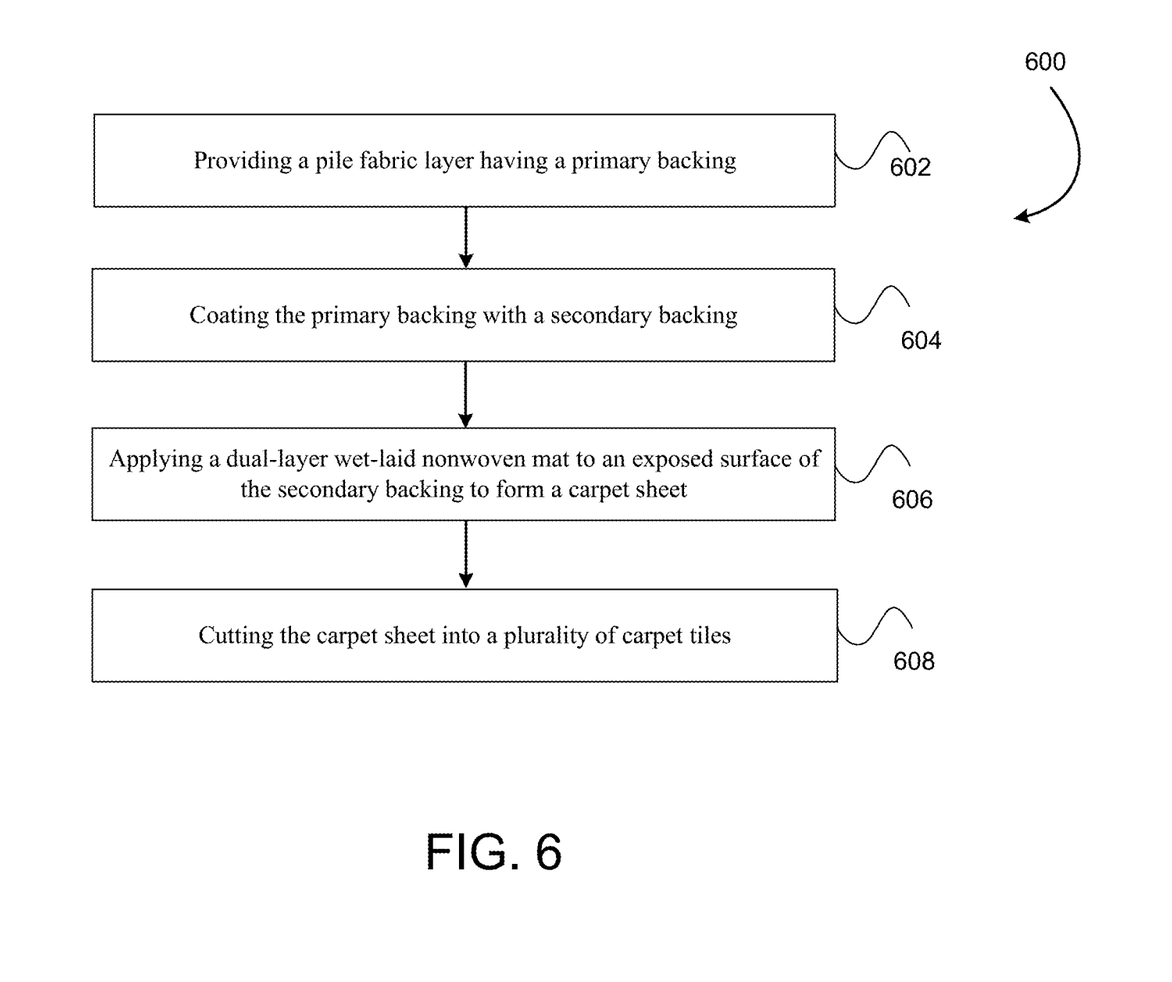
FIG. 6 is a schematic view of a manufacturing system that produces a carpet tile according to embodiments.

FIG. 6 depicts a single-pass process 600 for manufacturing a carpet tile, such as carpet tile 100, in accordance with the present invention. Process 600 begins at block 602 by coating greige goods with a thermoplastic/plastisol secondary backing. In some embodiments, the greige goods may be provided in the form of a pile fabric layer having a primary backing. For example, the primary backing may be a polyester, a polypropylene woven, and/or a nonwoven fabric. A thermoplastic/plastisol secondary backing may be applied to the greige goods by extruding a thermoplastic/plastisol material onto the primary backing of the greige goods at block 604. At block 606, a dual-layer wet-laid nonwoven mat may be applied to an exposed surface of the secondary backing to form a carpet sheet. For example, the mat may be laminated to the secondary backing material. In some embodiments, the first layer may be laminated to the secondary backing using a latex pre-coat. The dual-layer wet-laid nonwoven mat may be similar to the wet-laid nonwoven mat 110 described above. For example, the mat may include a first layer having a plurality of glass fibers and a binder and a second layer having a plurality of synthetic fibers and a binder. The binders are typically the same and are applied at the same time in a wet laid manufacturing process as described in accordance with FIGS. 3 and 4. The first layer of the wet-laid nonwoven mat may be positioned facing the secondary backing, and in many embodiments, may be positioned directly adjacent the secondary backing. However, it will be appreciated that in some embodiments, one or more additional layers such as scrims, etc. may be positioned between the first layer of the wet-laid nonwoven mat and the secondary backing. Process 600 may also include cutting the carpet sheet into a plurality of carpet tiles at block 608. Prior to being cut, the carpet sheet may be passed through one or more rollers, such as a nip chill roller assembly to set the adhesives to secure the various layers of the carpet sheet to one another.

In some embodiments, process 600 may include applying an adhesive to the exposed bottom surface of the second layer. The adhesive may be applied before or after the carpet sheet has been cut into individual carpet tiles. In some embodiments, the adhesive may be a pressure sensitive adhesive that enables the carpet tile to be installed by applying force to a top surface of the carpet tile once the tile is in its desired position on a floor substrate. In some embodiments, a release liner may be applied to the exposed surface of the adhesive to prevent the adhesive from adhering to another surface prior to installation of the carpet tile. During installation, the release liner may be peeled off to expose the adhesive.

Figure 7:
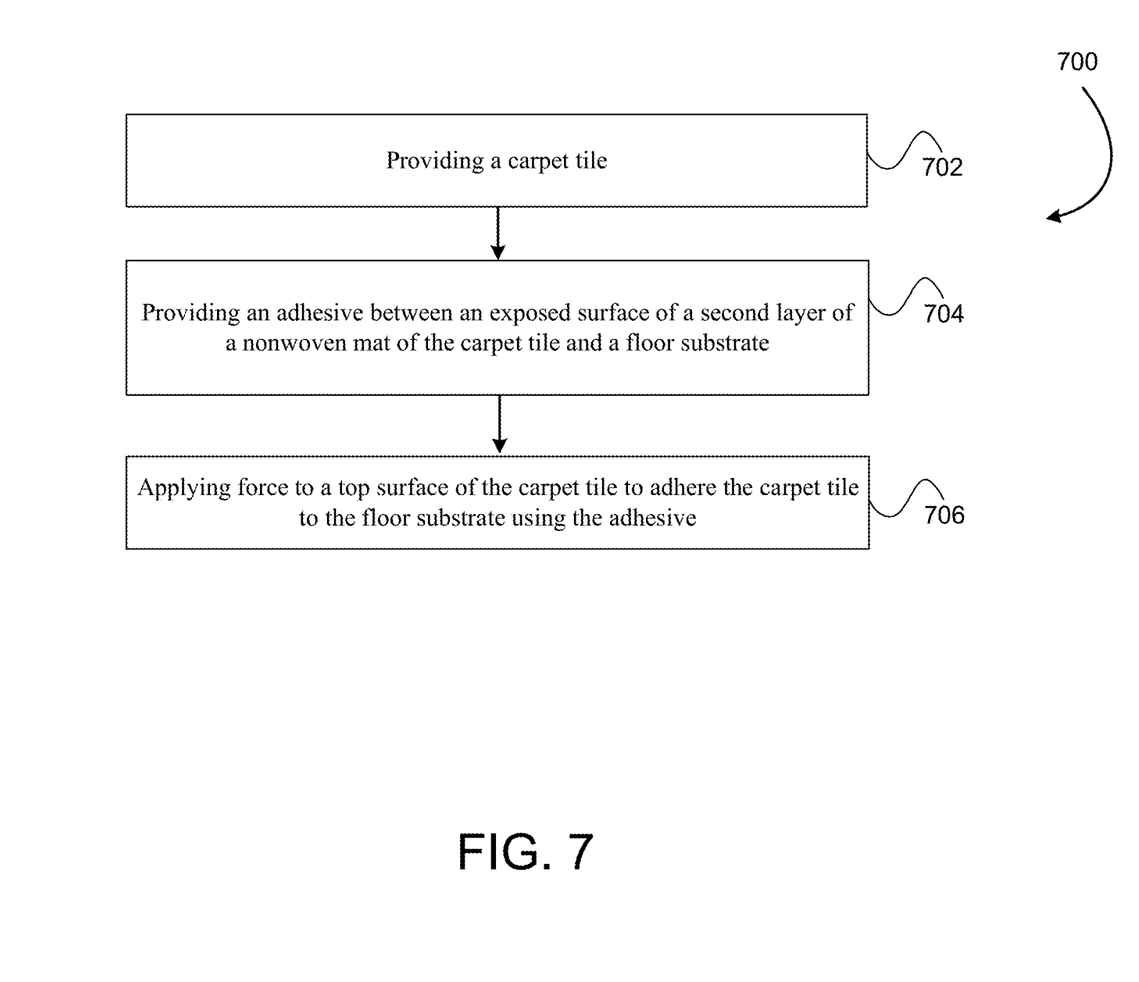
FIG. 7 is a schematic view of a manufacturing system that produces a carpet tile according to embodiments.

FIG. 7 depicts a process for manufacturing a carpet tile, such as carpet tile 100, in accordance with the present invention. Process 700 begins at block 702 by providing a carpet tile, such as carpet tile 100 described herein. For example, the carpet tile may include a pile fabric layer, a primary backing coupled with the pile fabric layer, a secondary backing coupled with the primary backing, and a dual-layer wet-laid nonwoven mat. The dual-layer wet-laid nonwoven mat may include a first layer having a plurality of glass fibers and a first binder and a second layer having a plurality of synthetic fibers and a second binder. Process 700 may involve providing an adhesive between an exposed surface of the second layer and a floor substrate at block 704. For example, the adhesive may be applied to the floor substrate just prior to placing the carpet tile against the floor substrate. In other embodiments, the adhesive is applied to the second layer prior to placing the carpet tile against the floor substrate. In some embodiments, this may be done during the installation process, while in other embodiments the adhesive may be applied to the carpet tile during the manufacturing process. For example, a pressure sensitive adhesive may be applied to the second layer with a release liner covering the exposed surface of the adhesive. During installation the release liner may be removed from the carpet tile to expose the pressure sensitive adhesive prior to positioning the carpet tile. At block 706, force is applied to a top surface of the carpet tile to adhere the carpet tile to the floor substrate using the adhesive.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/ or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A carpet tile, comprising:
   a pile fabric layer;
   a primary backing coupled with the pile fabric layer;
   a secondary backing coupled with the primary backing; and
   a dual-layer wet-laid nonwoven mat, the dual-layer wet-laid nonwoven mat comprising:
      a first layer comprising a plurality of glass fibers and a plurality of synthetic fibers;
      a second layer comprising a plurality of synthetic fibers and a plurality of glass fibers, and
      a single binder that bonds the plurality of glass fibers and plurality of synthetic fibers of the first layer together, bonds the plurality of synthetic fibers and plurality of glass fibers of the second layer together, and bonds the first layer and the second layer together, wherein:

a percentage by weight of the glass fibers in the first layer is between 70 and 99 percent and a percentage by weight of the synthetic fibers in the first layer is between 1 and 30 percent;
a percentage by weight of the synthetic fibers in the second layer is between 80 and 99 percent;
the plurality of glass fibers comprise coarse glass fibers having an average fiber diameter between about 8 and 25 um;
the plurality of glass fibers comprise glass microfibers having an average fiber diameter between about 0.5 and 6 um;
the plurality of synthetic fibers comprise a first type of synthetic fibers having an average denier of between 0.3 and 1 denier and a second type of synthetic fibers having an average denier of between 1.5 and 8 denier; and
a porosity of the first layer is greater than a porosity of the second layer.

2. The carpet tile of claim 1, further comprising:
a latex pre-coat applied between the primary backing and the secondary backing.

3. The carpet tile of claim 1, wherein:
the first layer is positioned adjacent the secondary backing.

4. The carpet tile of claim 1, wherein:
the plurality of synthetic fibers comprise one or more of polyester, polyolefin, or nylon.

5. The carpet tile of claim 1, wherein:
the secondary backing comprises a thermoplastic material or a plastisol.

6. The carpet tile of claim 1, wherein:
the first layer makes up between 10% and 70% of an overall thickness of the dual-layer wet-laid nonwoven mat; and
the second layer makes up between 30% and 90% of the overall thickness of the dual-layer wet-laid nonwoven mat.

7. The carpet tile of claim 1, wherein:
the first layer has a thickness of between 0.05 mm and 0.5 mm; and
the second layer has a thickness of between 0.05 mm and 1 mm.

8. The carpet tile of claim 1, wherein:
the first type of synthetic fibers makes up between 5% and 50% by weight of the plurality of synthetic fibers; and
the second type of synthetic fibers makes up between 50% and 95% by weight of the plurality of synthetic fibers.

9. The carpet tile of claim 1, wherein:
the primary backing comprises one or both of polyester and polypropylene.

10. The carpet tile of claim 1, wherein the binder is selected from the group consisting of a urea formaldehyde, a modified urea formaldehyde, an acrylic resins, a modified acrylic resins, a polyurethane, a polyvinyl chloride, a melamine resin, a homopolymer of polyacrylic acid, a copolymers of polyacrylic acid, a crosslinking acrylic copolymer, or a cross-linked vinyl chloride acrylate copolymer.

11. The carpet tile of claim 1, wherein an interface between the first layer and the second layer comprises intertwined glass fibers from the plurality of glass fibers and synthetic fibers from the plurality of synthetic fibers.

12. A carpet tile, comprising:
a pile fabric layer;
a primary backing coupled with the pile fabric layer;
a secondary backing coupled with the primary backing; and
a dual-layer wet-laid nonwoven mat, the dual-layer wet-laid nonwoven mat comprising:
a first layer comprising a plurality of glass fibers, a plurality of synthetic fibers, and a binder; and
a second layer comprising a plurality of synthetic fibers, a plurality of glass fibers, and the binder, wherein:
the binder bonds the plurality of glass fibers and plurality of synthetic fibers of the first layer together, bonds the plurality of synthetic fibers and plurality of glass fibers of the second layer together, and bonds the first layer and the second layer together, and
an interface between the first layer and the second layer comprises intertwined glass fibers from the plurality of glass fibers and synthetic fibers from the plurality of synthetic fibers,
a percentage by weight of the glass fibers in the first layer is between 70and 99 percent and a percentage by weight of the synthetic fibers in the first layer is between 1 and 30 percent,
a percentage by weight of the synthetic fibers in the second layer is between 80 and 99 percent;
a porosity of the first layer is greater than a porosity of the second layer,
the plurality of glass fibers comprise coarse glass fibers having an average fiber diameter between about 8 and 25 um,
the plurality of glass fibers comprise glass microfibers having an average fiber diameter between about 0.5 and 6 um, and
the plurality of synthetic fibers comprise a first type of synthetic fibers having an average denier of between 0.3 and 1 denier and a second type of synthetic fibers having an average denier of between 1.5 and 8 denier.

13. The carpet tile of claim 12, further comprising:
a latex pre-coat applied between the primary backing and the secondary backing.

14. The carpet tile of claim 12, wherein:
the first layer is positioned adjacent the secondary backing.

15. The carpet tile of claim 12, wherein:
the plurality of synthetic fibers comprise one or more of polyester, polyolefin, or nylon.

16. The carpet tile of claim 12, wherein:
the secondary backing comprises a thermoplastic material or a plastisol.

17. The carpet tile of claim 12, wherein:
the first layer makes up between 10% and 70% of an overall thickness of the dual-layer wet-laid nonwoven mat; and
the second layer makes up between 30% and 90% of the overall thickness of the dual-layer wet-laid nonwoven mat.

* * * * *